(12) United States Patent
Tung et al.

(10) Patent No.: US 7,223,021 B2
(45) Date of Patent: May 29, 2007

(54) ELECTRONIC DEVICE WITH ILLUMINATED NAMEPLATE

(75) Inventors: Tzu Hsien Tung, Taipei (TW); Hung-Chang Hung, Taipei (TW); Hui Tze Tsai, Taipei County (TW)

(73) Assignee: ASUSTek Computer Inc., Taipei (TW)

( * ) Notice: Subject to any disclaimer, the term of this patent is extended or adjusted under 35 U.S.C. 154(b) by 37 days.

(21) Appl. No.: 10/952,817

(22) Filed: Sep. 30, 2004

(65) Prior Publication Data
US 2005/0169598 A1    Aug. 4, 2005

(30) Foreign Application Priority Data
Jan. 29, 2004  (TW) ............... 93102062 A

(51) Int. Cl.
*G02B 6/10* (2006.01)
(52) U.S. Cl. .................. 385/58; 385/146; 385/70
(58) Field of Classification Search .............. None
See application file for complete search history.

(56) References Cited

U.S. PATENT DOCUMENTS 5,090,791 A * 2/1992 Kidder et al. ............. 385/18
5,377,702 A * 1/1995 Sakurai ..................... 132/271
5,909,180 A * 6/1999 Bailey et al. .............. 340/639
5,959,287 A * 9/1999 Myers et al. .......... 235/472.02
7,123,807 B2 * 10/2006 Ng et al. ................... 385/135
2002/0091850 A1 * 7/2002 Perholtz et al. ........... 709/231
2003/0100218 A1 * 5/2003 Tsai et al. .................. 439/490
2003/0106935 A1 * 6/2003 Burchette, Jr. ............. 235/380
2004/0228145 A1 * 11/2004 Wadia et al. ............... 362/560
2004/0240824 A1 * 12/2004 Lipski et al. ............... 385/135

* cited by examiner

*Primary Examiner*—Frank G. Font
*Assistant Examiner*—Eric Wong
(74) *Attorney, Agent, or Firm*—Birch, Stewart, Kolasch & Birch, LLP

(57) ABSTRACT

An electronic device with an illuminated nameplate includes at least one light-emitting device, at least one circuit board, at least one casing and at least one opening. In this casing, at least one connector connects with the circuit board. The casing has at least one nameplate. The light emitted by the light-emitting device passes through at least one part of the nameplate. The opening is formed on the nameplate.

15 Claims, 6 Drawing Sheets

ELECTRONIC DEVICE WITH ILLUMINATED NAMEPLATE

This Non-provisional application claims priority under 35 U.S.C. §119(a) on Patent Application No(s). 093102062 filed in Taiwan, Republic of China on Jan. 29, 2004, the entire contents of which are hereby incorporated by reference.

BACKGROUND OF THE INVENTION

1. Field of Invention

The invention relates to an electronic device and, in particular, to an electronic device with illuminated nameplate that allows light to pass via a board at the opening thereof to a connector.

2. Related Art

Due to the advance in technologies, electronic products play an important role in daily life. Take computers as an example, aside from using them to process documents, sending and receiving E-mail, browsing network information, people further use them to watch movies or to hold online video conferences as a result of mass production of large-size screens, large storage capacities, and high processing speeds. It is thus seen that computers have a very close relation with human life.

In offices or study rooms, it is not suitable to put the computer together with the screen on the desk or table due to its larger volume. Thus, people usually put the computer under the table to save space. Normally, connector interfaces 4 (see FIGS. 1 and 2) are provided on the back of the computer 5. When connecting a peripheral device (such as a mouse, joy stick, keyboard, scanner, video conference device, speaker, and digital stereo) to the computer, the user may not be able to quickly and correctly identify the position and type of a connector 6 because of the dim light (such as under a table). Therefore, it is very inconvenient and may result in damages to the connector and even the computer 5.

It is therefore an important subjective of the invention to provide an electronic device with an illuminated nameplate for solving the above-mentioned problem.

SUMMARY OF THE INVENTION

In view of the foregoing, the invention is to provide an electronic device with a nameplate, which allows the user to determine the type and position of a connector interface quickly and correctly.

To achieve the above, the electronic device of the invention includes at least one light-emitting device, a circuit board, at least one casing, and at least one opening. The connector is connected to the circuit board. The casing has at least one nameplate. Light emitted by the light-emitting device passes through at least one part of the nameplate. The opening is provided on the nameplate.

According to the invention, the light emitted by the light-emitting device can pass through the casing and shine on the region around the connector. In a dark environment, the connector of the invention is illuminated so that the user can clearly identify the type and position of the connector. This can avoid incorrect connections or misalignments of connectors and thus damages to the computer.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only, and thus are not limitative of the present invention, and wherein.

DETAILED DESCRIPTION OF THE INVENTION

The electronic device with a nameplate according to the embodiments of the invention will be described below with reference to relevant drawings, wherein the same elements are referred with the same reference numbers.

Figure 1:
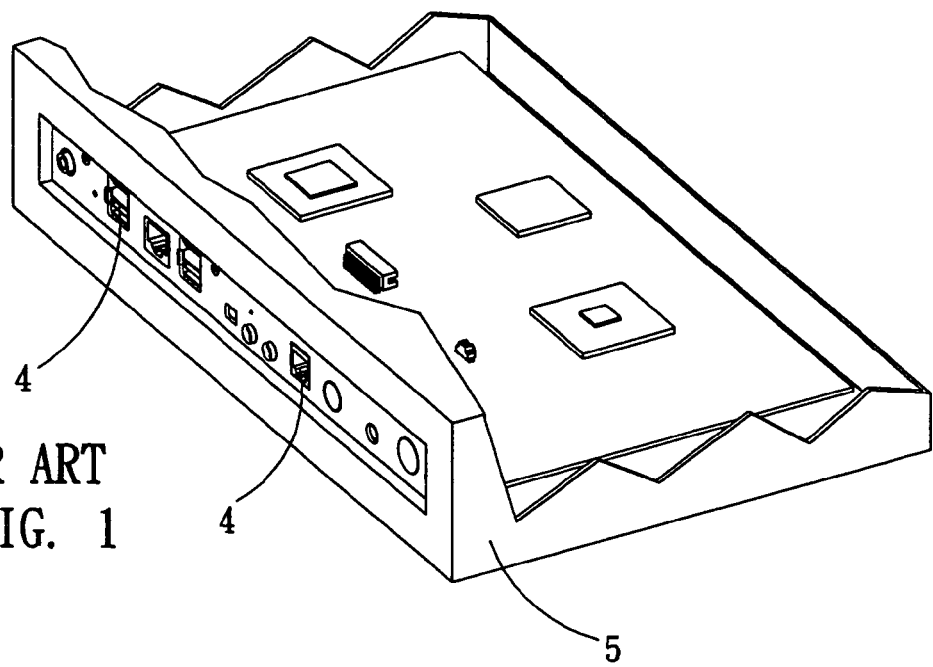
FIGS. 1 and 2 are schematic views showing a conventional connector installed in a computer.
Figure 2:
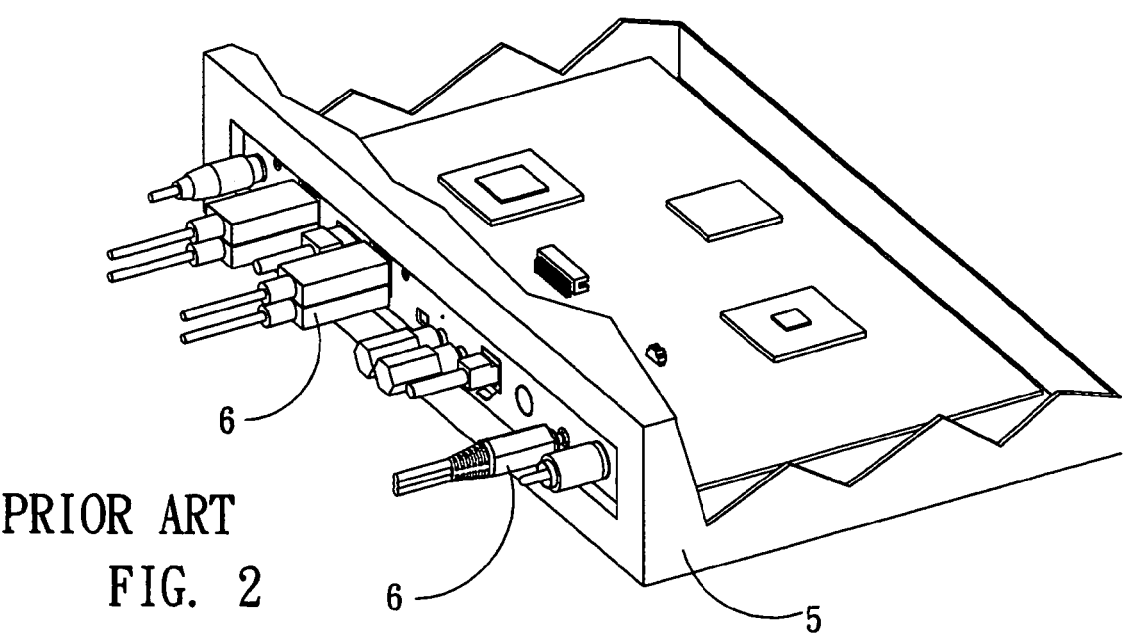
Figure 3:
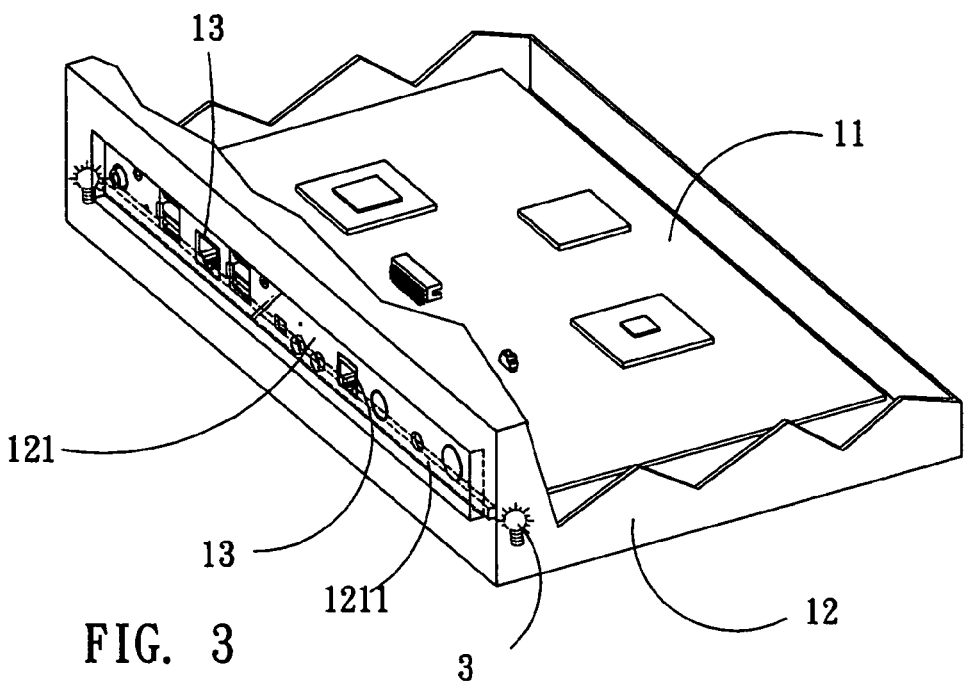
FIGS. 3 and 4 are a set of schematic views showing a part of an electronic device with a nameplate according to a preferred embodiment of the invention.
Figure 4:
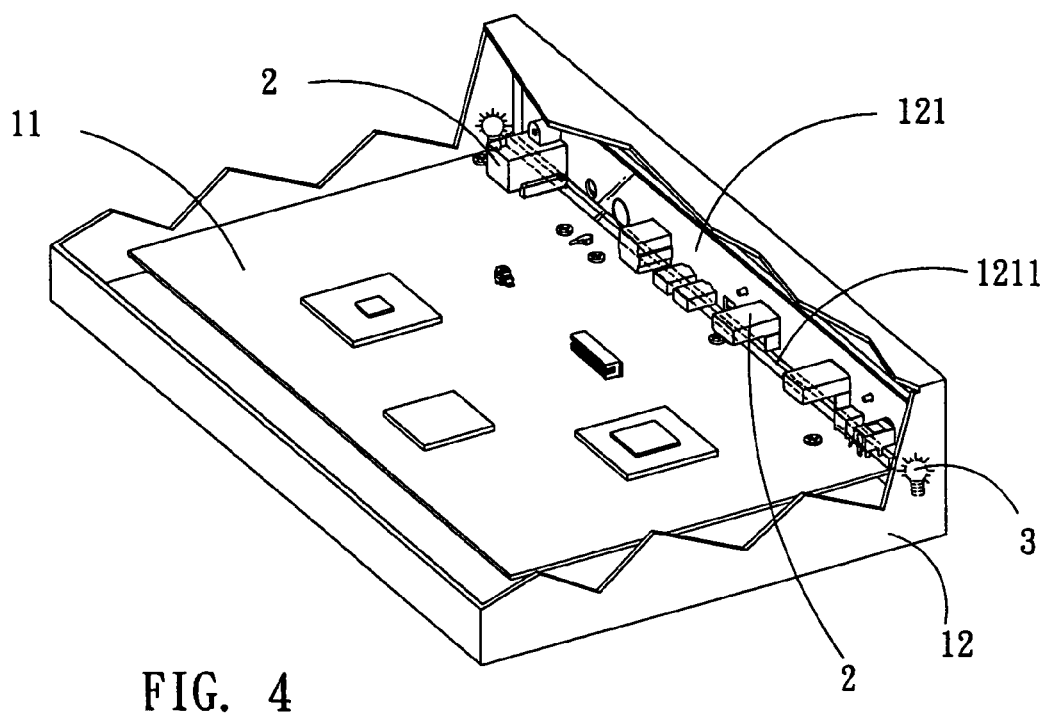
Figure 5:
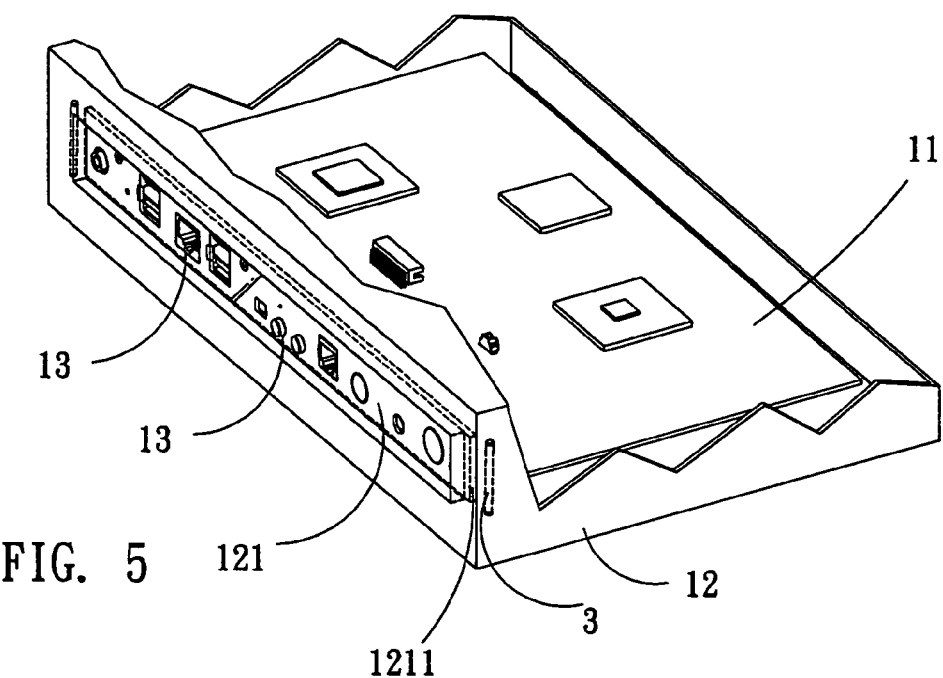
FIGS. 5 and 6 are another set of schematic views showing a part of the electronic device with a nameplate according to the preferred embodiment of the invention.

As shown in FIGS. 3 and 4, the electronic device with a nameplate according to a preferred embodiment of the invention includes at least one light-emitting device 3, at least one circuit board 11, at least one casing 12, and at least an opening 13. In the embodiment, at least one connector 2 is connected to the circuit board 11. The casing 12 has at least one nameplate 121. The light emitted by the light-emitting device passes through at least one part of the nameplate 121. The opening 13 is formed on the nameplate 121.

In the current embodiment, the connector 2 and the light-emitting device 3 are electrically connected with the circuit board 11.

The connector 2 in the current embodiment refers to any connecting component for communicating electrical signals and power along with its accessories. In general, connectors 2 for computers are divided into two types: I/O (input/output) and interconnection. The I/O connectors are used for signal transmissions between the host and peripheral devices such as the mouse, display, keyboard, printer, grapher, and network system. In this casing, the connectors may be circular, polygonal, or coaxial connectors. The interconnection is used inside the computer host and the peripherals as the connection among various modules. They include integrated circuit (IC) sockets, plate-edge connectors, flat cables, and the likes.

Moreover, the light-emitting device 3 of the embodiment is selected from fluorescent lamps (including cold cathode tubes and hot cathode tubes), light-emitting devices (LED), incandescent lamps, halide lamps, electroluminescence (EL) lamps, and the likes. Furthermore, the light-emitting device 3 can also be the fluorescent lamps, LED's, incandescent lamps, halide lamps, and EL lamps of the backlight module in the screen.

As shown in FIGS. 3 and 4, the casing 12 has at least one nameplate 121. The light emitted by the light-emitting device 3 passes through at least one part of the nameplate 121. The shape and size of the casing 12 in the embodiment can be adjusted according to actual needs.

In the current embodiment, the nameplate 121 is made of a transparent material, so that light can pass through the nameplate 121. The nameplate 121 is a transparent region of the casing 12, is polished, and is fixed on the casing 12.

Figure 6:
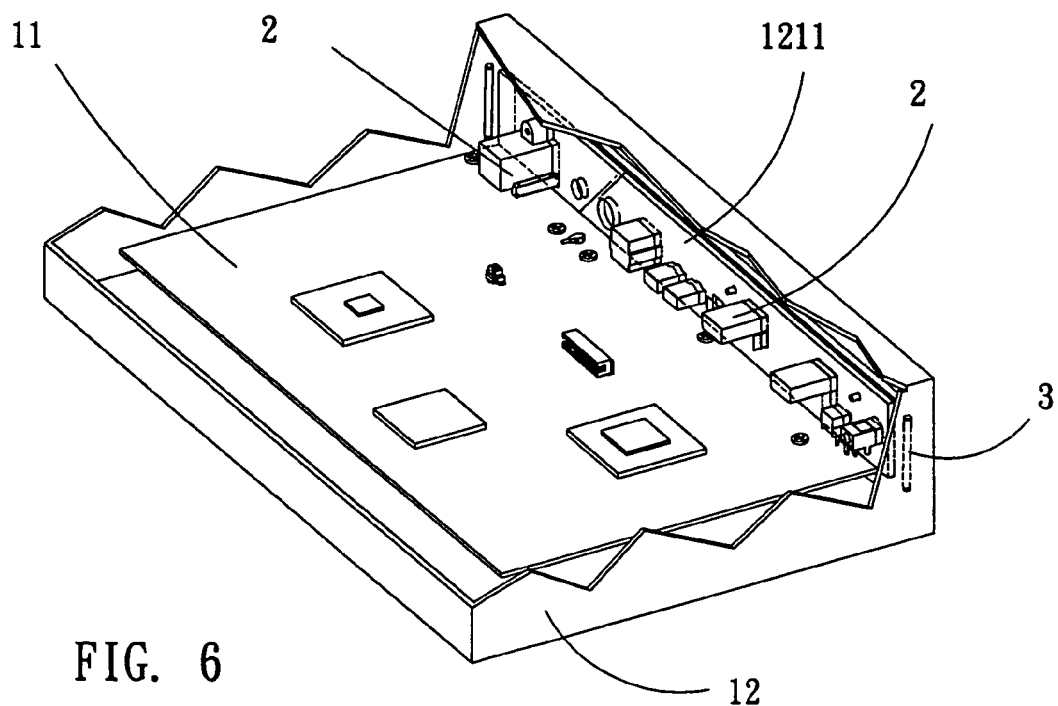
Figure 7:
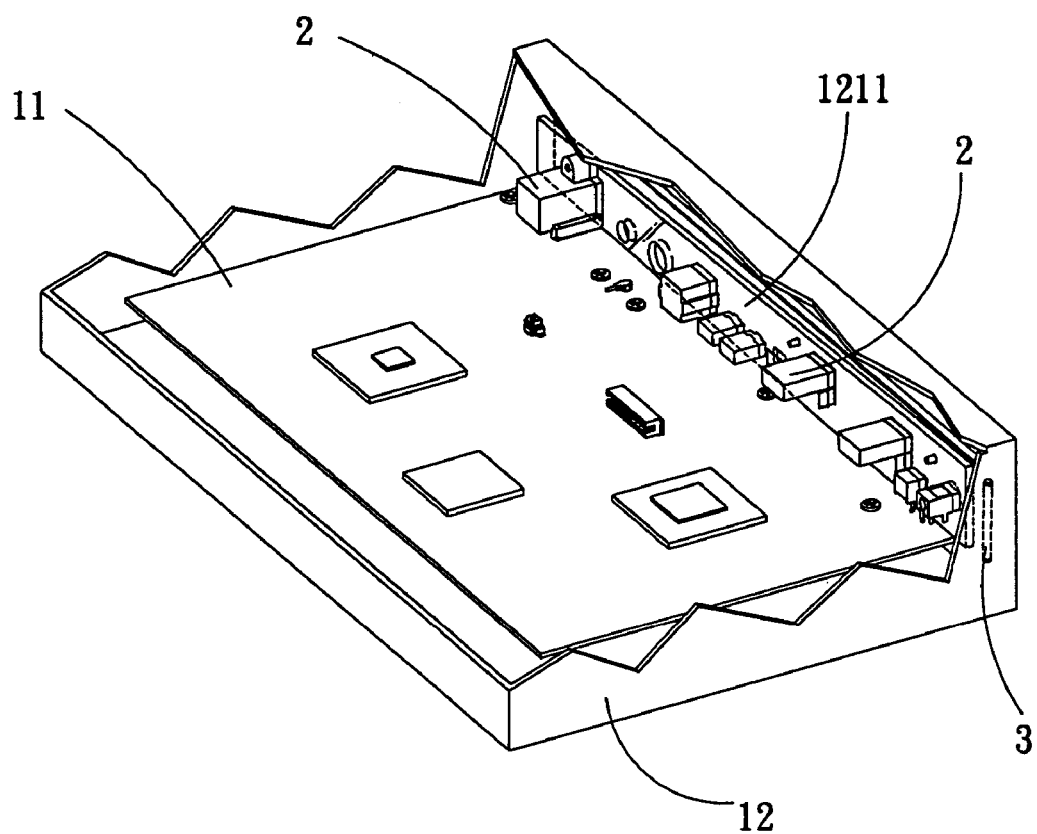
FIG. 7 is an additional schematic view showing the electronic device with a nameplate according to the preferred embodiment of the invention.
Figure 9:
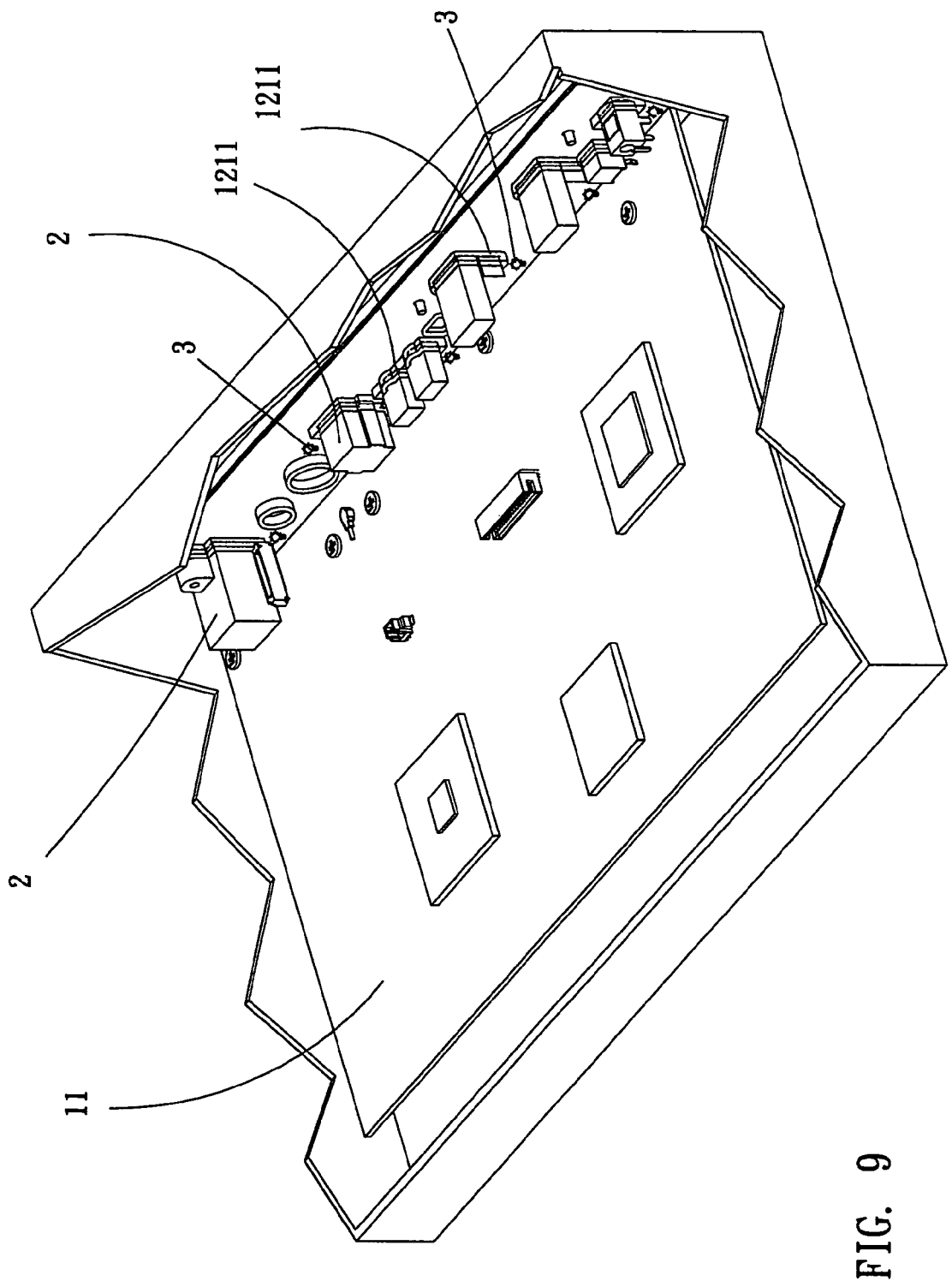

The light-passes board 121 further includes a light-guiding device 1211. Light emitted from the light-emitting device 3 enters the light-guiding device 1211 to illuminate the nameplate 121. In the embodiment, the light-guiding device 1211 is a light-guiding rod (as shown in FIG. 4 and FIG. 9) or a light-guiding plate (as shown in FIG. 6 and FIG. 7). The light-guiding device 1211 is the propagation medium for the light-emitting device 3. The shape and material of the light-guiding device 1211 may affect the luminance and homogeneity of the light emitted from the light-emitting device 3. In the present embodiment, the light-guiding device 1211 can be a point light-guiding plate. This point light-guiding plate has a printing material containing a highly emitting material (such as $SiO_2$ and $TiO_2$) printed on the bottom surface of the light-guiding plate. Thus, the light can be emitted from the front surface of the light-guiding device homogeneously. In addition, the light-guiding device 1211 can be an ejection-forming light-guiding plate. In the present embodiment, the light-guiding device 1211 is fixed on the nameplate 121. Of course, the light-guiding device 1211 can be installed inside the casing 12.

As shown in FIGS. 3 and 4, the light-guiding device 1211 is a light-guiding rod and installed on at least one side of the nameplate 121. Herein, the light-emitting devices 3 are point light-emitting devices installed on both sides of the light-guiding device 1211.

Figure 8:
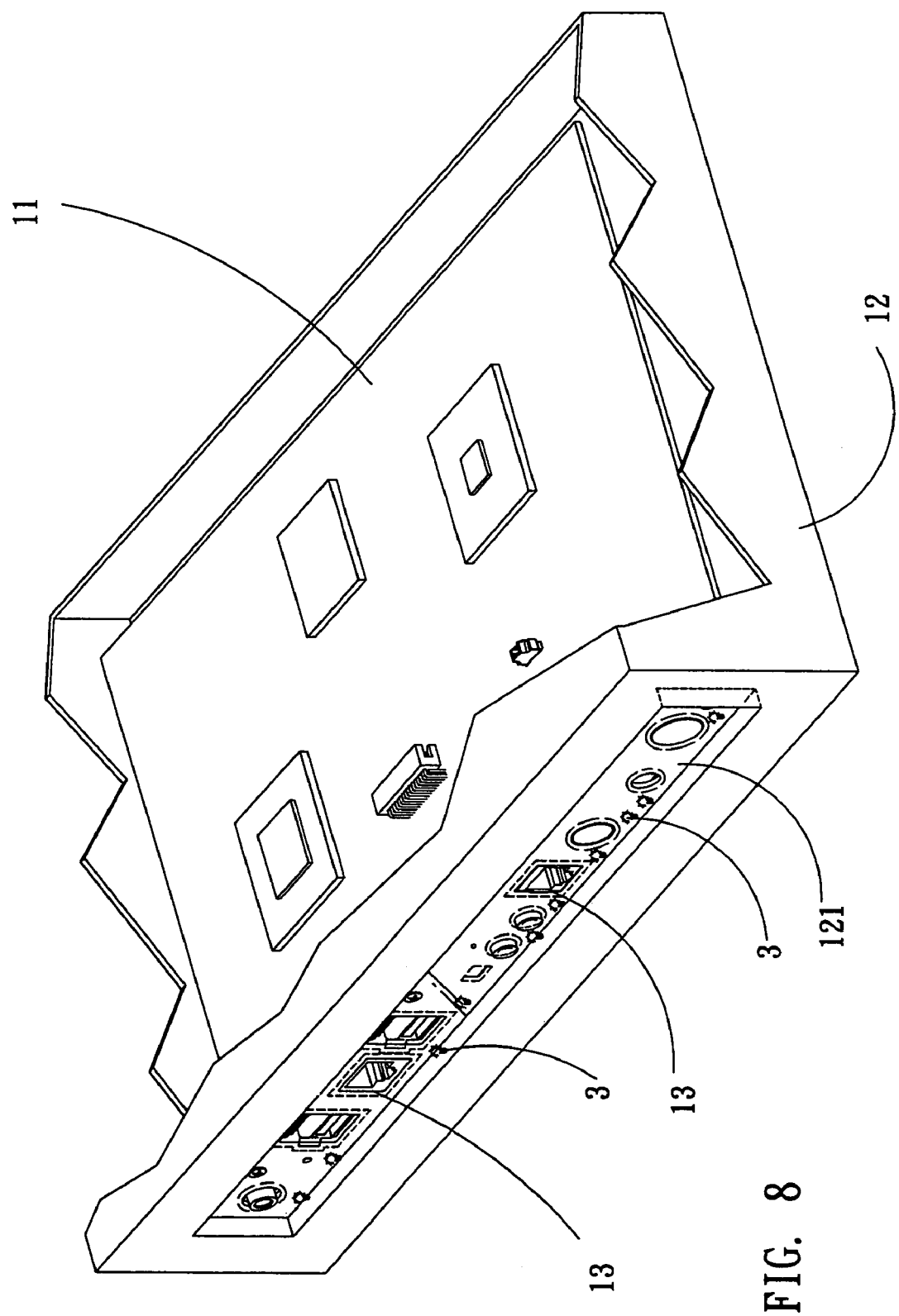
FIGS. 8 and 9 are yet another set of schematic views of the electronic device with a nameplate according to the preferred embodiment of the invention.

As shown in FIGS. 8 and 9, the light-emitting device 1211 is installed on at least one side of the connector 2. The light-emitting device 1211 has an annular tube shape installed around the connector 2. Herein, the light-emitting device 3 is installed on one corner of the light-emitting device 1211.

In the embodiment, the thickness and size of the light-emitting device 1211, the size and type of the light-emitting device 3, and the relative positions of them can be adjusted in accordance with practical needs.

With further reference to FIGS. 3 and 4, the connector 2 is embedded in the opening 13. The shape and size of the opening 13 is thus determined according to those of the connector 2.

The electronic device with a nameplate according to the embodiment includes but is not limited to computers, notebook computers, and servers.

According to the invention, since light emitted from the light-emitting device can penetrate through the casing, the emitted light can shine on the region around the connector. Thus, the user can clearly recognize the type and position of the connector, avoiding damages happening to the computer due to incorrect plug-in or misalignment. Accordingly, the invention can solve problems encountered in the prior art.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An electronic device, comprising:
   a light-emitting device;
   at least one circuit board connected with at least one connector;
   at least one casing having at least one nameplate, wherein the nameplate is made of a transparent material and wherein the light emitted from the light-emitting device passes through at least one portion of the nameplate; and
   at least one opening provided on the nameplate, wherein the connector is inserted into the opening.

2. The electronic device of claim 1, wherein the nameplate further comprises a light-guiding device, and the light emitted from the light-emitting device enters the light-guiding device and illuminates the nameplate.

3. The electronic device of claim 2, wherein the light-guiding device is a light-guiding rod.

4. The electronic device of claim 2, wherein the light-guiding device is a light-guiding plate.

5. The electronic device of claim 2, wherein the light-guiding device is fixed on the nameplate.

6. The electronic device of claim 2, wherein the light-guiding device is installed inside the casing.

7. The electronic device of claim 1, wherein the connector is inserted to the opening.

8. The electronic device of claim 1, wherein the light-emitting device is installed on at least one side of the nameplate.

9. The electronic device of claim 1, wherein the light-emitting device is installed on at least one side of the connector.

10. The electronic device of claim 1, wherein the light-guiding device is installed on at least one side of the nameplate.

11. The electronic device of claim 1, wherein the light-guiding device is installed on at least one side of the connector.

12. The electronic device of claim 1, wherein the light-emitting device is a light-emitting diode (LED).

13. The electronic device of claim 1, wherein the light-emitting device is a screen.

14. The electronic device of claim 1, wherein the nameplate is fixed on the casing.

15. An electronic device, comprising:
    a light-emitting device;
    at least one circuit board connected with at least one connector;
    at least one casing having at least one nameplate, wherein the nameplate is a polished transparent region on the casing and wherein the light emitted from the light-emitting device passes through at least one portion of the nameplate; and
    at least one opening provided on the nameplate, wherein the connector is inserted into the opening.

* * * * *